US008644309B2

(12) United States Patent
Fujita

(10) Patent No.: US 8,644,309 B2
(45) Date of Patent: Feb. 4, 2014

(54) QUARANTINE DEVICE, QUARANTINE METHOD, AND COMPUTER-READABLE STORAGE MEDIUM

(75) Inventor: Keisuke Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 182 days.

(21) Appl. No.: 13/240,369

(22) Filed: Sep. 22, 2011

(65) Prior Publication Data

US 2012/0082063 A1  Apr. 5, 2012

(30) Foreign Application Priority Data

Sep. 30, 2010 (JP) .................................. 2010-221558

(51) Int. Cl.
*H04L 12/28* (2006.01)
(52) U.S. Cl.
USPC ............ 370/389; 370/392; 370/250; 370/435
(58) Field of Classification Search
None
See application file for complete search history.

(56) References Cited

U.S. PATENT DOCUMENTS

| 7,835,341 | B2 * | 11/2010 | Inujima et al. | 370/349 |
| 2006/0256730 | A1 * | 11/2006 | Compton | 370/250 |
| 2006/0274768 | A1 * | 12/2006 | Suzuki et al. | 370/401 |
| 2012/0254980 | A1 * | 10/2012 | Takahashi | 726/13 |

FOREIGN PATENT DOCUMENTS

JP  2008-054204 A  3/2008

* cited by examiner

*Primary Examiner* — Duc C Ho
(74) *Attorney, Agent, or Firm* — Sughrue Mion, PLLC

(57) ABSTRACT

A quarantine device 1 performs processing on a network provided with a VLAN-aware Layer 2 Switch 7. The quarantine device 1 includes a terminal detection unit 11 that, when a single terminal is connected to a specified port of the Layer 2 Switch 7 through a VLAN-unaware hub, detects a connection of a new terminal 4 to the hub, and a switch control unit 12 that, upon detecting the connection of the new terminal 4, configures the specified port as a trunk port and, furthermore, configures a first VLAN, which transfers only Ethernet frames having preset tags attached thereto, and a second VLAN, which transfers only Ethernet frames having no tags attached thereto, on the specified port.

15 Claims, 10 Drawing Sheets

QUARANTINE DEVICE, QUARANTINE METHOD, AND COMPUTER-READABLE STORAGE MEDIUM

CROSS-REFERENCE TO RELATED APPLICATION

This application is based upon and claims the benefit of priority from Japanese patent application No. 2010-221558, filed on Sep. 30, 2010, the disclosure of which is incorporated herein in its entirety by reference.

BACKGROUND OF THE INVENTION

1. Field of the Invention

The present invention relates to a quarantine device, a quarantine system, and, furthermore, a quarantine method used to quarantine terminals connected to a network, as well as to a computer-readable recording medium that store a software program used to implement the above.

2. Background Art

In recent years, in order to address the increased number of infections with worms, viruses, etc. through networks, businesses have been actively deploying quarantine systems (for example, see JP 2008-54204A). Quarantine systems maintain network security by isolating terminals that do no meet requirements pre-defined by security policies, such as those with out-of-date OS patch files, definition files for anti-virus software, etc., from the work network.

A Layer 2 Switch having VLAN (Virtual LAN) capability (hereinafter, referred to as a VLAN aware Layer 2 Switch) is commonly utilized in this type of quarantine systems in order to provide a more fine and exact control over the network. The Layer 2 Switch controls the network at a layer (data link layer) that is deeper than the layer utilized for Internet protocol-based communications.

In particular, in a quarantine system, a VLAN-aware Layer 2 Switch is provided in advance with a VLAN used for work purposes and a VLAN used for isolation purposes. Additionally, a quarantine server, which forms part of the quarantine system, associates terminals connected to the Layer 2 Switch with either one of the VLANs depending on the security policies of the terminals.

This means that when a terminal is connected to any of the ports of the Layer 2 Switch, the quarantine server detects the connection of the terminal to the port through the SNMP protocol (Simple Network Management Protocol). Additionally, the quarantine server checks whether an agent program has been installed on the terminal, performs security policy checks, etc.

After that, the quarantine server attaches only safe terminals that meet security policy requirements to the work VLAN and authorizes their connection to the work network. In addition, the quarantine server uses the isolation VLAN to isolate terminals that do not meet the security policy requirements. In addition, terminals belonging to the isolation VLAN cannot communicate with anything except for the quarantine server and communicate only with the quarantine server.

Furthermore, after subjecting terminals having no agent programs deployed thereon and terminals that do not meet security policy requirements to processing intended to satisfy security policy requirements, such as agent program installation, and the like, the quarantine server connects them to the work VLAN. As a result, the security of the network is protected.

In addition, in the above-described quarantine system, a separate VLAN can be configured for each port of the Layer 2 Switch, in which case the isolation and recovery of terminals can be realized on a per-port basis. Furthermore, an isolation VLAN can be allocated to each terminal, in which case quarantine can be established for each individual terminal.

Incidentally, connecting a single terminal or information appliance directly to each port on the Layer 2 Switch is a pre-requisite in above-described quarantine system. On the other hand, there are, in fact, situations wherein, for example, a hub having no VLAN capability (hereinafter, referred to as a VLAN-unaware hub) is connected to a port of the Layer 2 Switch and multiple terminals are further connected to this VLAN-unaware hub.

In the above-described case, all the terminals under the VLAN-unaware hub belong to the same VLAN. Therefore, for example, if a terminal that meets security policy requirements is connected as a first terminal to the VLAN-unaware hub, then the port, to which the VLAN-unaware hub is connected, ends up being connected to the work VLAN by the quarantine server.

Then, when a second terminal is connected to the VLAN-unaware hub, this terminal, regardless of whether an agent program has or has not been deployed on it, ends up being connected to the network used for work purposes even if the requirements established by the security policy are not met. The problem with the above-described quarantine system is that when multiple terminals are connected to a port of the Layer 2 Switch through a VLAN-unaware hub, said terminals cannot be individually isolated from, and recovered back into, the work network.

SUMMARY OF THE INVENTION

It is an exemplary object of the present invention to eliminate the above-mentioned problems and provide a quarantine device, a quarantine system, a quarantine method, and a software program capable of quarantining terminals on an individual basis when multiple terminals are connected to a port of the Layer 2 Switch through a VLAN-unaware concentrator.

In order to achieve the above-mentioned object, a quarantine device according to an exemplary aspect of the present invention is a quarantine device performing quarantine processing on a network provided with a VLAN-aware Layer 2 Switch and includes: a terminal detection unit that, when a single terminal is connected to a specified port of the Layer 2 Switch through a VLAN-unaware concentrator, detects a connection of a new terminal to the concentrator, and a switch control unit that, upon detecting the connection of the new terminal, configures the specified port as a trunk port and, furthermore, configures a first VLAN, which transfers only Ethernet frames having preset tags attached thereto, and a second VLAN, which transfers only Ethernet frames having no tags attached thereto, on the specified port.

In order to achieve the above-mentioned object, a quarantine system according to an exemplary aspect of the present invention includes a quarantine device performing quarantine processing on a network provided with a VLAN-aware Layer 2 Switch and multiple terminals connected to the network; the quarantine device includes: a terminal detection unit that, when a single terminal among the multiple terminals is connected to a specified port of the Layer 2 Switch through a VLAN-unaware concentrator, detects a connection of another terminal to the concentrator, and a switch control unit that, upon detecting the connection of the other terminal, configures the specified port as a trunk port and, furthermore, configures a first VLAN, which transfers only Ethernet frames having preset tags attached thereto, and a second VLAN, which transfers only Ethernet frames having no tags attached thereto, on the specified port; and the terminals connected to the concentrator attach tags to the Ethernet frames transmitted by said terminals when so instructed by the quarantine device.

In addition, in order to achieve the above-mentioned object, a quarantine method according to an exemplary aspect of the present invention is a quarantine method for performing quarantine processing on a network provided with a VLAN-aware Layer 2 Switch and includes the steps of: (a) when a single terminal is connected to a specified port of the Layer 2 Switch through a VLAN-unaware concentrator, detecting a connection of a new terminal to the concentrator; and (b) upon detecting the connection of the new terminal in Step (a), configuring the specified port as a trunk port and, furthermore, configuring a first VLAN, which transfers only Ethernet frames having preset tags attached thereto, and a second VLAN, which transfers only Ethernet frames having no tags attached thereto, on the specified port.

In addition, in order to achieve the above-mentioned object, a computer-readable storage medium according to an exemplary aspect of the present invention is a computer-readable storage medium having recorded thereon a software program for performing quarantine processing on a network provided with a VLAN-aware Layer 2 Switch using a computer. The medium has recorded thereon a software program including instructions causing the computer to execute the steps of: (a) when a single terminal is connected to a specified port of the Layer 2 Switch through a VLAN-unaware concentrator, detecting the connection of a new terminal to the concentrator; and (b) upon detecting the connection of the new terminal in Step (a), configuring the specified port as a trunk port and, furthermore, configuring a first VLAN, which transfers only Ethernet frames having preset tags attached thereto, and a second VLAN, which transfers only Ethernet frames having no tags attached thereto, on the specified port.

In view of the features above, the present invention allows for quarantine to be established on each terminal on an individual basis when multiple terminals are connected to a port of the Layer 2 Switch through a VLAN-unaware concentrator.

EXEMPLARY EMBODIMENT

Outline of the Invention

Figure 1:
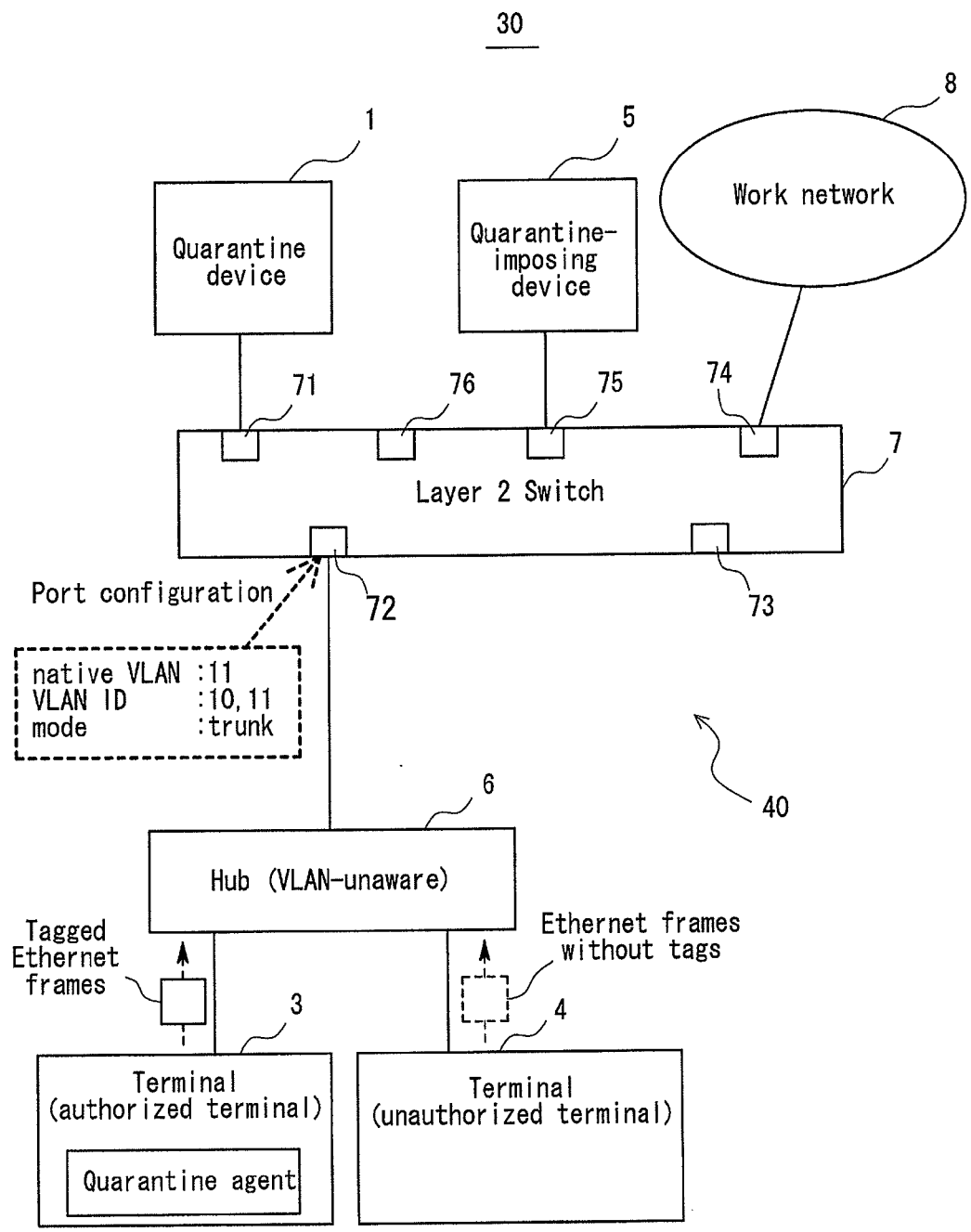
FIG. 1 is a diagram illustrating the overall configuration of the quarantine system used in Embodiment 1 of the present invention.

The port of the Layer 2 Switch monitored by the quarantine device (a server device used for quarantine purposes) is usually configured as an access port. By contrast, in the present invention, in a situation where a single terminal has been connected to the (VLAN-unaware) hub that is connected to the port, the quarantine device, upon connection of a second terminal to this hub, configures said port as a trunk port at the moment when the connection is detected.

In addition, a new VLAN is defined for this trunk port. The newly defined VLAN is connected to an isolated network capable of communicating only with the quarantine device (hereinafter referred to as "the isolated NW (Net Work)") and is further configured as a "native VLAN". Since this newly defined VLAN is different from the conventional isolation VLANs configured separately for a single port, in this Description, it is referred to as the "native isolation VLAN".

The term "native VLAN" usually refers to a VLAN that communicates Ethernet (registered trademark) frames without VLAN tags. Upon receipt of an Ethernet frame having a VLAN tag attached thereto, the Layer 2 Switch transfers it as a frame belonging to the native VLAN. It should be noted that while in many cases the VLAN number (VLAN ID) of the native VLAN is set to "1" by default, it can be changed at will.

In addition to the "native isolation VLAN" connected to the isolated NW a "work VLAN", which is connected to the work network (hereinafter referred to as the "work NW (Net Work)"), is also configured on the port configured in the trunk. Upon receipt of an Ethernet frame having no VLAN tags, the Layer 2 Switch transfers it as a frame belonging to the work VLAN. Thus, configuration is performed so as to permit communication only with the isolated NW and the work NW via the port configured in the trunk.

The above-described configuration of the Layer 2 Switch permits communication of Ethernet frames with attached VLAN tags and communication of Ethernet frames having no attached VLAN tags via the port configured in the trunk. In addition, depending on the presence/absence of a VLAN tag, the Layer 2 Switch transfers the Ethernet frames either to the work NW or to the isolated NW.

Accordingly, for example, an agent deployed on a terminal is imparted with the capability to attach VLAN tags (hereinafter referred to as "work NW VLAN tags"). In such a case, terminals having agents deployed thereon (hereinafter referred to as "authorized terminals") can communicate with the work NW because the agent attaches work NW VLAN tags to the Ethernet frames.

On the other hand, a terminal that has no agents deployed thereon (hereinafter referred to as an "unauthorized terminal") ends up communicating within the "native isolation VLAN" because work NW VLAN tags cannot be attached to the Ethernet frames. In addition, during communication within the native isolation VLAN, the terminal can communicate only with the quarantine server via the isolated NW.

For this terminal to connect to the work NW, it has to communicate with the quarantine server and has to have an agent program installed thereon.

As shown above, for example, even when a terminal having no agents deployed thereon, or a terminal that has an agent deployed thereon but does not meet the security policy requirements, is connected to the VLAN-unaware hub, this terminal can be isolated from, and recovered back into, the work NW on an individual basis.

Embodiment 1

Figure 2:
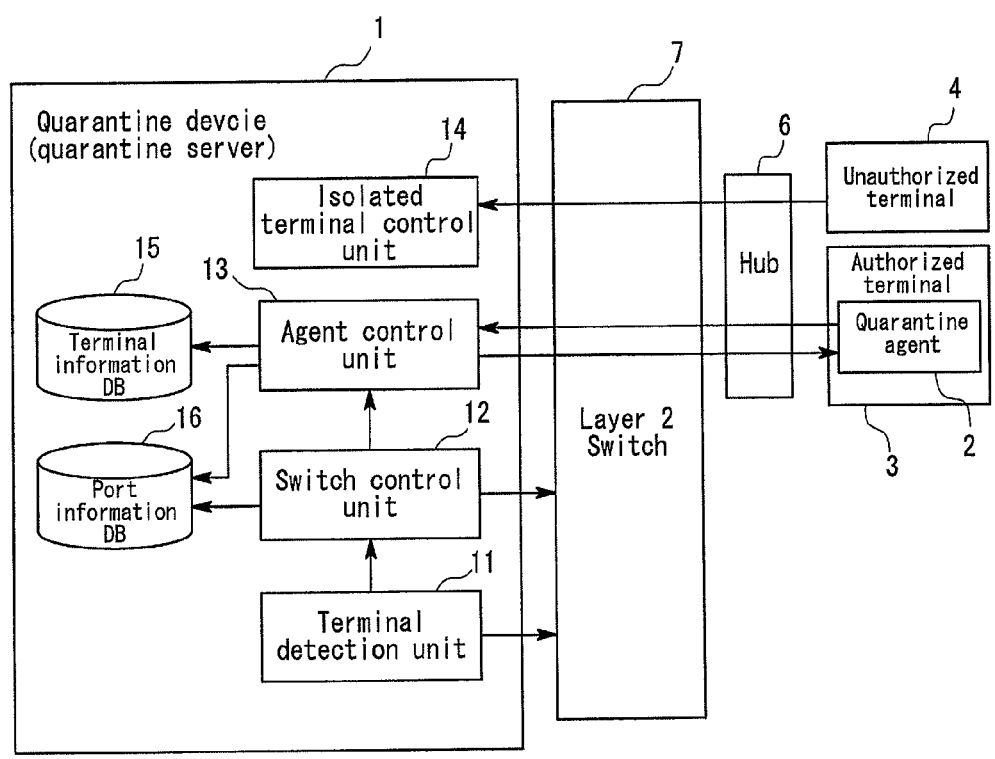
FIG. 2 is a block diagram illustrating the configuration of the quarantine device forming part of the quarantine system in Embodiment 1 of the present invention.

Below, the quarantine device, quarantine system, quarantine method, and software program used in Embodiment 1 of the present invention will be described with reference to FIG. 1-FIG. 6. First of all, the configuration of the quarantine device and quarantine system used in Embodiment 1 will be described with reference to FIG. 1 and FIG. 2. FIG. 1 is a diagram illustrating the overall configuration of the quarantine system used in Embodiment 1 of the present invention. FIG. 2 is a block diagram illustrating the configuration of the quarantine device that forms part of the quarantine system in Embodiment 1 of the present invention.

As shown in FIG. 1, the quarantine system 30 used in Embodiment 1 includes a quarantine device 1, which performs quarantine processing on a network 40, and terminals 3 and 4, which are connected to the network 40. The quarantine device 1 and terminals 3 and 4 form part of the network 40. As used herein, the term "quarantine processing" in Embodiment 1 includes not only isolating terminals connected to the network from the work NW and then performing recovery processing, such as deploying agent programs and applying patches, but also includes performing recovery processing on already isolated terminals.

In addition, the network 40 includes a Layer 2 Switch 7. In this embodiment, the network 40 further includes a quarantine-imposing device 5, a work network (work NW) 8, and a hub 6 connected to the port 72 of the Layer 2 Switch 7.

The Layer 2 Switch 7 possesses the capability to virtually partition the network, i.e. the so-called "VLAN capability". Specifically, the Layer 2 Switch 7 possesses tagged VLAN capability conforming to an international standard, IEEE802.1Q. Furthermore, the Layer 2 Switch 7 has the capability to communicate with the quarantine device 1 using a network management protocol. The SNMP (Simple Network Management Protocol) etc., which is defined by RFCs, i.e. the industry standards for the Internet, is suggested as the network management protocol.

In addition, the Layer 2 Switch 7 includes ports 71-76. Among them, the quarantine device 1 is connected to the port 71. The port 71 is configured as a trunk port capable of transmitting Ethernet frames respectively belonging to multiple tagged VLANs. On the other hand, the ports 72-76 are configured as access ports. It should be noted that under certain conditions, as described below, the port 72, to which the hub 6 is connected, is configured as a trunk port.

The hub 6 is a concentrator used in networks configured for the Ethernet and does not possess VLAN capability. The hub 6 is equivalent to a Layer 2 Switch that has neither VLAN capability nor SNMP capability, which can be substituted for the hub 6.

Work network 8, which is a work network such as an intranet, etc., is used for connecting to work servers and the Internet. In addition, the work network 8 may include an access path to an upstream enterprise network.

The terminal 3 and the terminal 4, which are both computers used by the users of the network 40, are connected to the port 72 of the Layer 2 Switch 7 through the medium of the VLAN-unaware hub 6. In this embodiment, the terminal 3 is the first to be connected to the hub 6 and the terminal 4 subsequently connected to the hub 6.

Incidentally, a situation wherein the VLAN-unaware hub 6 is connected to the Layer 2 Switch 7 and only one terminal 3 is connected to this hub 6, is equivalent to the terminal 3 being directly connected to the port in the Layer 2 Switch 7. Therefore, if an agent program has been deployed by the terminal 3 and, at the same time, the requirements established by the security policy have been met, the Layer 2 Switch 7 connects the terminal 3 to the work network 8. In the past, when a terminal having no agent programs deployed thereon or a terminal that had an agent program deployed thereon but did not meet the requirements established by the security policy, was connected to the hub 6 in this state, even such a terminal was connected to the work network. However, in this embodiment, as described below, such a connection is prevented by the quarantine device 1.

As shown in FIG. 2, the quarantine device 1 includes a terminal detection unit 11 and a switch control unit 12. If a single terminal 3 is connected to the port 72 of the Layer 2 Switch 7 (see FIG. 1) through the medium of the VLAN-unaware hub 6, the terminal detection unit 11 detects the connection of another terminal 4 to the hub 6.

When the connection of the terminal 4 is detected, the switch control unit 12 configures the port 72, to which the hub 6 is connected, as a trunk port. In addition, along with defining an isolation VLAN, the switch control unit 12 configures this isolation VLAN as a native VLAN (native isolation VLAN). Furthermore, the switch control unit 12 configures a work VLAN and a native isolation VLAN on the port 72.

As described above in the Outline of the Invention, the work VLAN is a tagged VLAN that transfers only Ethernet frames having configured tags attached thereto and is connected to the work NW. In addition, the native isolation VLAN is a native VLAN that transfers only Ethernet frames having no tags attached thereto and is connected to the isolated NW (not shown in FIG. 1 and in FIG. 2). It should be noted that in Embodiment 1 the VLAN number (VLAN ID) of the work VLAN is set to "11" and the VLAN number (VLAN ID) of the native isolation VLAN is set to "10".

In addition, when instructed by the quarantine device 1, the terminal 3 and the terminal 4 connected to the hub 6 attach tags to the Ethernet frames transmitted by said terminals. In other words, the terminals can connect to the work network 8 only when permitted to do so by the quarantine device 1; in all other cases, they are connected to the isolated NW and communicate only with the quarantine device 1 and quarantine-imposing device 5.

Accordingly, the quarantine device 1 and quarantine system 30 allow for quarantine to be established on each terminal on an individual basis even when multiple terminals are connected to a port of the Layer 2 Switch 7 through a VLAN-unaware concentrator.

It should be noted that in this embodiment the network 40 is not limited to the examples of FIG. 1 and FIG. 2. While the example of FIG. 1 used only two terminals for illustration, the number of terminals is not limited. In addition, the terminals may be directly connected to any port of the Layer 2 Switch 7. Furthermore, three or more terminals may be connected to the hub 6. In addition, while the example of FIG. 1 used only one Layer 2 Switch 7 for illustration, the number of Layer 2 Switches 7 is not limited.

Here, the configuration of the quarantine device 1 and quarantine system 30 used in this embodiment will be described more specifically with reference to FIG. 3-FIG. 5.

Figure 3:
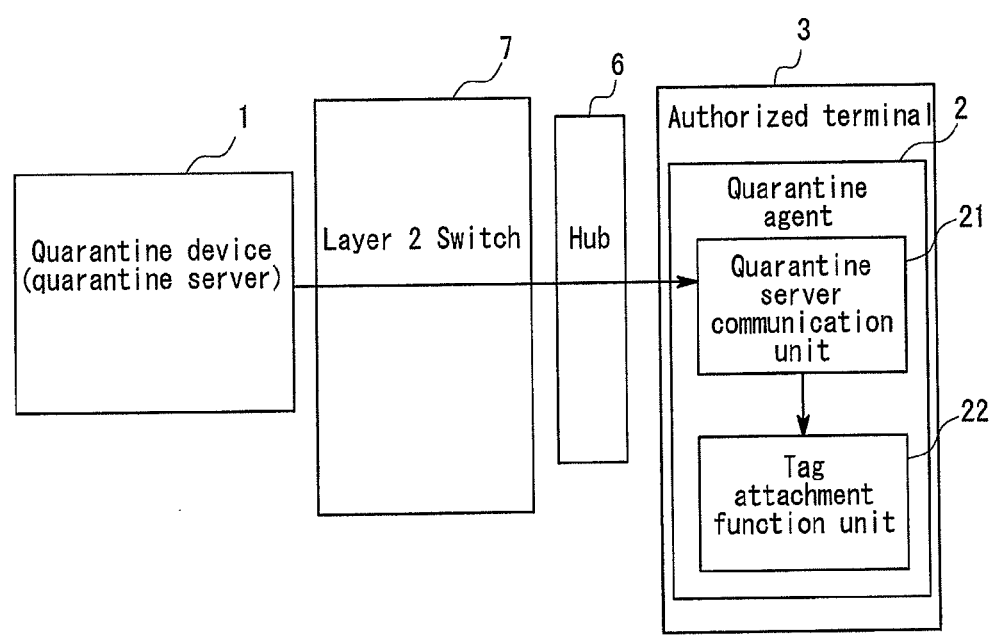
FIG. 3 is a block diagram illustrating the configuration of the terminals forming part of the quarantine system in Embodiment 1 of the present invention.

FIG. 3 is a block diagram illustrating the configuration of the terminals forming part of the quarantine system in Embodiment 1 of the present invention. FIG. 4 is diagram illustrating an example of terminal information stored in the terminal information database shown in FIG. 1. FIG. 5 is diagram illustrating an example of port information stored in the port information database shown in FIG. 1.

In this embodiment, of the two terminals 3 and 4, an agent program enabling communication with the quarantine device 1 in deployed on the terminal 3. When the agent program is executed on the terminal 3, as shown in FIG. 1, FIG. 2 and FIG. 3, a quarantine agent 2 is created in the terminal 3.

In addition, as shown in FIG. 3, the quarantine agent 2 includes a quarantine server communication unit 21 and a tag attachment function unit 22. Further, based on this arrangement, the quarantine agent 2 collects the security policy of the terminal 3, notifies the quarantine-imposing server 5 of the collected results, communicates with the quarantine server 1, and attaches tags to Ethernet frames. The respective capabilities of the quarantine server communication unit 21 and tag attachment function unit 22 will be described below.

It should be noted that in this embodiment the terminal 3 is a terminal whose security level meets the preset criteria (hereinafter referred to as "authorized terminal"), while the terminal 4 (hereinafter referred to as "unauthorized terminal") is a terminal whose security level does not meet the preset criteria. The expression "whose security level meets the preset criteria" means that an agent program has been deployed on the terminal, and, at the same time, the terminal meets the requirements established by the security policy. If any of these conditions are not satisfied, it means that the security level of the terminal does not meet the preset criteria.

In addition, as shown in FIG. 2, in addition to the terminal detection unit 11 and switch control unit 12, the quarantine device 1 includes an agent control unit 13, an isolated terminal control unit 14, a terminal information database (hereinafter referred to as "terminal information DB (Data Base)") 15, and a port information database (hereinafter referred to as "the port information DB (Data Base)" 16. Furthermore, in Embodiment 1, the quarantine device 1 monitors the port 72, to which the hub 6 of the Layer 2 Switch 7 is connected. In addition, in practice, the quarantine device 1 is implemented using a software program deployed on a server computer.

Figure 4:
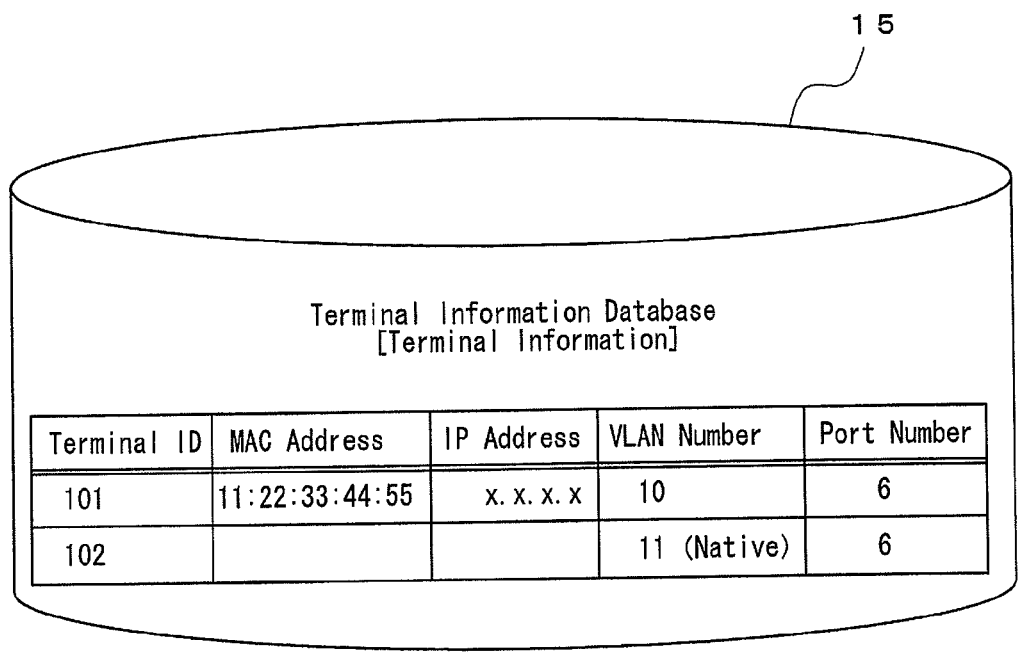
FIG. 4 is diagram illustrating an example of terminal information stored in the terminal information database shown in FIG. 1.

As shown in FIG. 4, information on terminals connected to the Layer 2 Switch 7 monitored by the quarantine server 1 (hereinafter referred to as "terminal information") is registered in the terminal information DB 15. In the example of FIG. 4, information on the terminal 3 and the terminal 4, which are connected to the port 72 of the Layer 2 Switch 7 through the medium of the VLAN-unaware hub 6, is stored as terminal information. The terminal information is made up of a terminal ID, an MAC address, an IP address, a VLAN number, and a port number for each terminal.

It should be noted that in FIG. 4 the terminal with the terminal ID of "101" is the terminal 3 and the terminal with the terminal ID of "102" is the terminal 4. As described above, the terminal 4, which has a terminal ID of "102", does not have an agent program deployed or quarantine agent 2 created thereon. As a result, it does not have an MAC address or an IP address registered for it.

Figure 5:
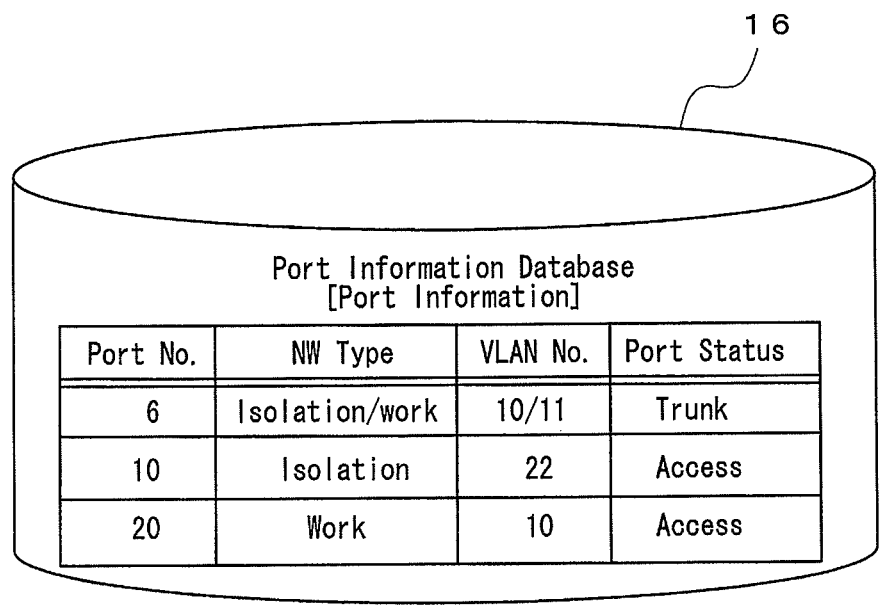
FIG. 5 is diagram illustrating an example of port information stored in the port information database shown in FIG. 1.

As shown in FIG. 5, information on the ports of the Layer 2 Switch 7 monitored by the quarantine server 1 (hereinafter referred to as "port information") is registered in the port information DB 16. The port information is made up of a port number, a connected network type, a VLAN number (VLAN ID), and a port status for each port.

In FIG. 5, the port with a port number of 6 is the port 72, to which the hub 6 is connected, the port with a port number of 10 is port 73, and the port with a port number of 20 is port 76. In addition, FIG. 5 contains information that represents a situation, in which the port 72, which has a port number of 6, has been configured as a trunk port by the switch control unit 12. In particular, for the port 72, which has a port number of 6, the port information DB 16 lists a VLAN number (VLAN ID=10) of a native isolation VLAN and a VLAN number (VLAN ID=11) of a work VLAN. For this reason, the terminals connected to the port 72 can communicate either with the work NW 8 (VLAN ID=10) or with the isolated NW.

Furthermore, in FIG. 5, the port 73, which has a port number of 10, is configured as an access port. The terminal connected to the port 73 communicates with the isolated NW via a VLAN, whose VLAN number (VLAN ID) is "22". In addition, in the same manner, the port 76, which has a port number of 20, is configured as an access port, and the terminal connected to the port 76 communicates with the work NW 8 via a VLAN, whose VLAN number (VLAN ID) is "10".

It should be noted that the invention is not limited to the example of FIG. 5 and either one or both of the port 73, which has a port number of 10, and the port 76, which has a port number of 20, may be configured as trunk ports in the same manner as the port 72, which has a port number of 6. In addition, in this case, the VLAN number of a native isolation VLAN and the VLAN number of a work VLAN are also listed for the ports configured as trunk ports.

As described above, if the terminal 3 is connected to the port 72 of the Layer 2 Switch 7 through the medium of the VLAN-unaware hub 6, the terminal detection unit 11 detects the terminal 4 when the terminal 4 is connected to the hub 6. At such time, in Embodiment 1, the terminal detection unit 11 accesses the port information DB 16, acquires port information for the port 72, to which the hub 6 is connected, and communicates it to the switch control unit 12.

In particular, the terminal detection unit 11 can detect the connection of the terminal 4 by executing, for example, the following processing. At first, when the terminal connects to the hub 6, the terminal detection unit 11 detects ARP packets broadcasted by the terminal and identifies the originating MAC address. Furthermore, the terminal detection unit 11 performs the detection of ports with multiple registered MAC addresses, including sender MAC addresses, among the ports of the Layer 2 Switch 7. When a port with multiple registered MAC addresses is detected, the terminal detection unit 11 determines that 2 or more terminals are connected to this port.

In Embodiment 1, when the switch control unit 12 receives a notification of port information from the terminal detection unit 11, the port mentioned in the notification is configured as a trunk port, and furthermore, a work VLAN and a native isolation VLAN are configured on the above-mentioned port. In addition, the switch control unit 12 accesses the port information DB 16 and updates the port information. Furthermore, the switch control unit 12 transmits the terminal information of the terminals (in Embodiment 1, terminals 3 and 4) connected to the port configured in the trunk to the agent control unit 13.

When the work VLAN and native isolation VLAN are configured by the switch control unit 12, the agent control unit 13 identifies terminals having an agent program deployed thereon among the terminals connected to the hub 6 based on the terminal information transmitted by the switch control unit 12. In Embodiment 1, the agent control unit 13 identifies the terminal 3 as a terminal having an agent program deployed thereon.

In addition, only terminals having a deployed agent program, and, at the same time, satisfying the requirements established by the security policy, are instructed by the agent control unit 13 to attach tags to the Ethernet frames they transmit.

Specifically, in Embodiment 1, the agent control unit 13 instructs the quarantine agent 2 of the terminal 3 to issue a security policy audit request to the hereinafter described quarantine-imposing device 5 (see FIG. 1). Then, if the audit conducted by the quarantine-imposing device 5 finds that the requirements of the security policy are satisfied, the agent control unit 13, along with sending information on tags (VLAN tags) used to associate Ethernet frames with the work VLAN to the quarantine agent 2, issues instructions to attach the tags.

In addition, if the audit conducted by the quarantine-imposing device 5 finds that the requirements established by the security policy are not satisfied, the agent control unit 13 receives instructions from the quarantine-imposing device 5 directing it to isolate the audited terminal 3. The agent control unit 13 then transmits instructions to stop tag attachment to the quarantine server communication unit 21 of the terminal 3 (see FIG. 3). In addition, if the requirements established by the security policy on the terminal 3 are subsequently satisfied, then, as noted above, the agent control unit 13 transmits information on tags (VLAN tags) and issues instructions to attach the tags. Furthermore, upon completion of the above-described processing, the agent control unit 13 accesses the terminal information DB 15 and updates the registered terminal information.

The isolated terminal control unit 14 executes quarantine processing on terminals having no agent programs deployed thereon and terminals whose security status does not meet the preset criteria among the terminals connected to the hub 6. Specifically, in response to a request from the terminal 4, which belongs to the native isolation VLAN, the isolated terminal control unit 14 distributes the agent program used to create the quarantine agent 2.

In addition, the isolated terminal control unit 14 also performs processing intended to enable the terminal 4, which belongs to the native isolation VLAN, to satisfy the requirements established by the security policy, such as, for example, the distribution of patch files, etc. Furthermore, the isolated terminal control unit 14 can monitor the communications of the terminal 4, which belongs to the native isolation VLAN, and can respond to service requests from the terminal 4.

In response to a request from the quarantine agent 2, the quarantine-imposing device 5 (see FIG. 1) checks the terminal security policy collected by the quarantine agent 2 and determines whether or not the terminal meets the requirements established by the security policy. In practice, the quarantine-imposing device 5, in the same manner as the quarantine device 1, is implemented using a software program deployed on a server computer.

Then, if it is determined that the terminal does not satisfy the requirements established by the security policy, the quarantine-imposing device 5 directs the quarantine device 1 to isolate the terminal. On the other hand, if it is determined that the terminal satisfies the requirements established by the security policy, the quarantine-imposing device 5 informs the quarantine device 1 of this. When an instruction or notification is issued by the quarantine-imposing device 5, as described above, processing is carried out by the agent control unit 13 of the quarantine device 1.

As described above with reference to FIG. 3, in Embodiment 1, the terminal (authorized terminal) 3 includes a quarantine server communication unit 21 and a tag attachment function unit 22. The quarantine server communication unit 21 receives information on VLAN tags from the quarantine device 1 and, based on the received information, directs the tag attachment function unit 22 to attach VLAN tags.

First, the tag attachment function unit 22 obtains information received by the quarantine server communication unit 21 and instructions therefrom. Then, based on the received instructions, the tag attachment function unit 22 attaches VLAN tags used for transfer in the work VLAN to the Ethernet frames transmitted from the network interface card of the terminal.

In Embodiment 1, the Ethernet frames transmitted from the terminal (authorized terminal) 3 have VLAN tags attached thereto. In this case, based on the VLAN tags, the Layer 2 Switch 7 determines that the VLAN number of the VLAN to which these Ethernet frames belong is "11". As a result, the authorized terminal 3 is enabled for communication in the work NW 8.

On the other hand, Ethernet frames having no VLAN tags attached thereto are transmitted from the terminal (unauthorized terminal) 4 because the unauthorized terminal 4, which has no agent programs deployed thereon, does not have the capability to attach VLAN tags to Ethernet frames. Then, upon receipt of such Ethernet frames, the Layer 2 Switch 7 determines that they belong to the native isolation VLAN and transfers these Ethernet frames to the native isolation VLAN (VLAN ID=11).

Since the native isolation VLAN is connected to the isolated NW, as a result, the unauthorized terminal 4 can communicate only with the quarantine server 1. However, even in this state, the terminal 4 is enabled for communication in the work NW 8 if the unauthorized terminal 4 acquires an agent program from the quarantine device 1 in the isolation VLAN and the requirements established by the security policy are satisfied as a result the quarantine processing performed by the quarantine device 1.

Figure 6:
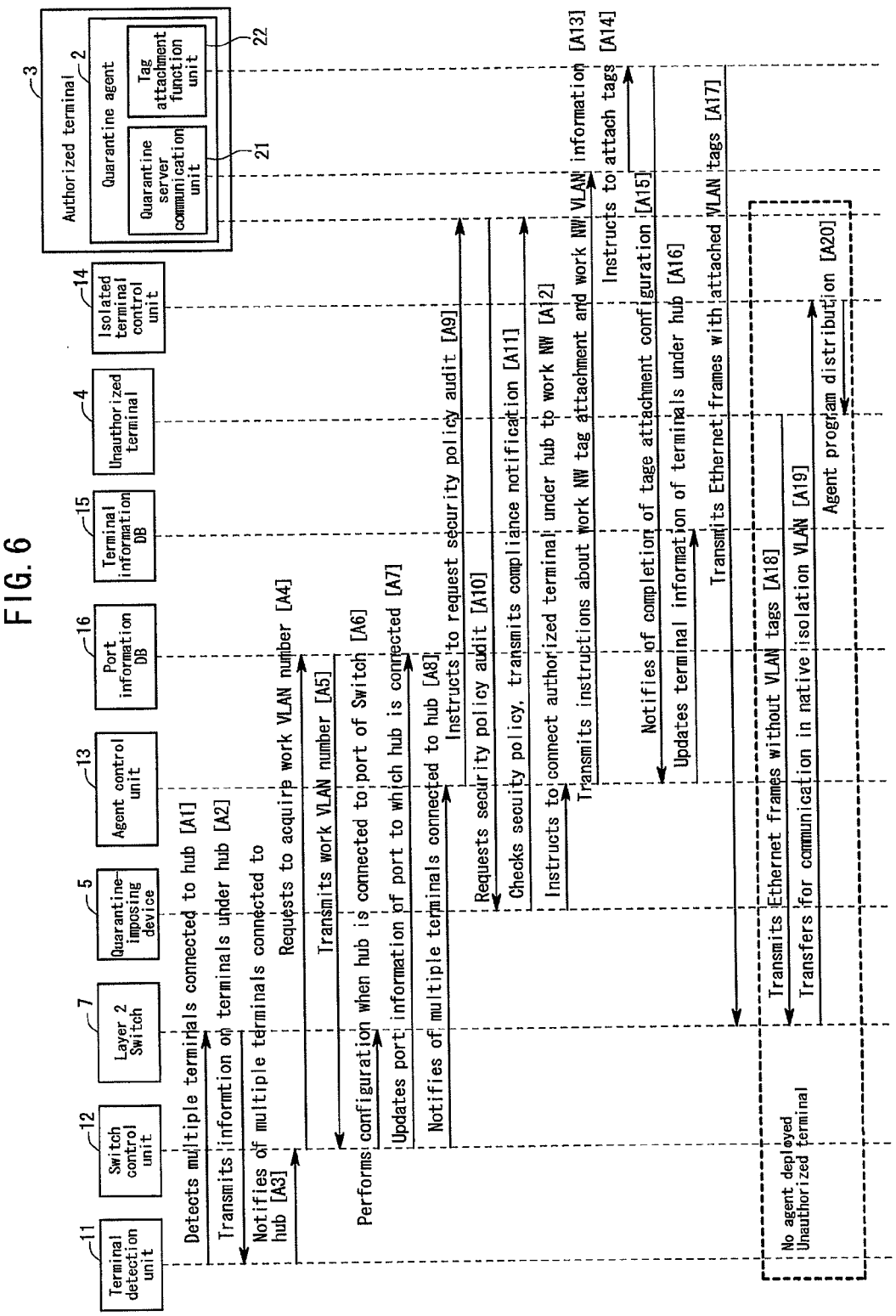
FIG. 6 is a sequence diagram illustrating the operation of the quarantine system used in Embodiment 1 of the present invention.

Next, the operation of the quarantine device 1 and quarantine system 30 used in Embodiment 1 of the present invention will be described with reference to FIG. 6. FIG. 6 is a sequence diagram illustrating the operation of the quarantine system used in Embodiment 1 of the present invention. In the description that follows, refer to FIG. 1-FIG. 5 as appropriate. In addition, in Embodiment 1, the quarantine method is executed by operating the quarantine device 1. Accordingly, the description of the quarantine method used in Embodiment 1 is replaced by the following description of the operation of the quarantine device 1.

As shown in FIG. 6, at first, the terminal detection unit 11 in the quarantine device 1 monitors the ports of the Layer 2 Switch 7. When a new terminal 4 is connected to the hub 6 in a state where the VLAN-unaware hub 6 is connected to a specified port in the Layer 2 Switch 7 and, furthermore, a single terminal 3 is connected to the hub 6, the terminal detection unit 11 detects this (Step A1).

Next, the terminal detection unit 11 acquires information on the terminal connected to this port through the hub 6 (such as the MAC address, IP address, and port number of the terminal (see FIG. 4)) from the Layer 2 Switch 7 (Step A2). Then, the terminal detection unit 11 transmits the acquired terminal information to the switch control unit 12, thereby notifying it of the fact that multiple terminals are connected to the hub 6 (Step A3).

Next, the switch control unit 12 identifies the port that has multiple terminals connected thereto based on the terminal information received from the terminal detection unit 11. The switch control unit 12 then requests the VLAN number of the work VLAN configured on the identified port from the port information DB 16 (Step A4) and, after that, acquires the VLAN number of the work VLAN (Step A5).

Next, the switch control unit 12 configures the port 72, to which the VLAN-unaware hub 6 of the Layer 2 switch 7 is connected (Step A6). Specifically, first of all, the switch control unit 12 defines a new isolation VLAN that can communicate only with the quarantine device 1, and then configures the defined isolation VLAN as a native VLAN (native isolation VLAN). Subsequently, the switch control unit 12 configures the port 72 as a trunk port. Finally, the switch control unit 12 configures a native isolation VLAN used to connect to the isolated NW and a work VLAN used to connect to the work NW 8 on the port 72, which is configured as a trunk port, thereby enabling communication with two NWs on the port 72.

Next, the switch control unit 12 accesses the port information DB 16 and updates the port information of the port, to which the hub 6 is connected (Step A7). Next, the switch control unit 12 outputs information on the port 72, to which the multiple terminals of the VLAN-unaware hub 6 are connected, namely, the port number and the VLAN number of the work VLAN, to the agent control unit 13 and notifies it of the fact that multiple terminals are connected to the hub 6 (Step A8).

Next, the agent control unit 13 identifies the authorized terminal 3 having an agent program deployed thereon, and instructs the quarantine agent 2 of the authorized terminal 3 to request a security policy audit from the quarantine-imposing device 5 (Step A9). Next, the quarantine agent 2 collects the security policy of the authorized terminal 3, where it is deployed. Based on the collected security policy, the quarantine agent 2 then makes an audit request to the quarantine-imposing device 5 (Step A10).

Next, based on the audit request from the quarantine agent 2, the quarantine-imposing device 5 checks the security policy of the authorized terminal 3, on which the quarantine agent 2 is deployed, and determines whether or not the terminal meets the requirements established by the security policy. Then, if it is determined that the terminal is in compliance, the quarantine-imposing device 5 transmits a compliance notification to the quarantine server communication unit 21 of the quarantine agent 2 (Step A11).

Next, after issuing a compliance notification to the quarantine server communication unit 21, the quarantine-imposing device 5 instructs the agent control unit 13 to connect the authorized terminal 3 to the work NW 8 (Step A12). Then, based on the information (MAC address and IP address) regarding the authorized terminal 3 obtained from the quarantine-imposing device 5 and the VLAN number of the work VLAN obtained from the switch control unit 12, the agent control unit 13 transmits information on the VLAN tags used in the work NW and instructions to attach the VLAN tags to the quarantine server communication unit 21 of the quarantine agent 2 (Step A13).

Next, the quarantine server communication unit 21 in the quarantine agent 2 outputs information on the VLAN tags used with the work NW received from the agent control unit 13 to the tag attachment function unit 22. Furthermore, the quarantine server communication unit 21 instructs the tag attachment function unit 22 to attach the VLAN tags when Ethernet frames are transmitted (Step A14).

Upon execution of Step A14, the agent control unit 13 receives a notification from the tag attachment function unit 22 showing that VLAN tag attachment configuration is complete (Step A15). Next, the agent control unit 13 accesses the terminal information DB 15 and updates the terminal information of the terminals connected to the hub 6 based on the information received from the switch control unit 12 in Step A8 (Step A16).

In addition, information that can be acquired regarding the unauthorized terminal 4, on which the quarantine agent 2 is not deployed, is limited. Accordingly, when Step A16 is executed, the agent control unit 13, as shown in FIG. 4, registers only the terminal ID, VLAN number, and port number for the unauthorized terminal 4. If the terminal information DB 15 is used, the manager of the quarantine system 30 can determine the condition of each terminal.

After that, in order to enable the authorized terminal 3 to communicate in the work NW 8, the tag attachment function unit 22 of the quarantine agent 2 transmits Ethernet frames having VLAN tags intended for use with the work NW 8 to the Layer 2 Switch 7 (Step A17). When Step A17 is executed, the Layer 2 Switch 7 determines that the VLAN tags of the Ethernet frames transmitted from the authorized terminal 3 are VLAN tags intended for use with the work NW 8 and transfers these Ethernet frames to the work NW 8.

On the other hand, since the quarantine agent 2 is not deployed on the unauthorized terminal 4, no VLAN tags are attached to the Ethernet frames transmitted to the Layer 2 Switch 7 from the unauthorized terminal 4 (Step A18). Therefore, the Layer 2 Switch 7 determines that the Ethernet frames received from the unauthorized terminal 4, on which the quarantine agent 2 is not deployed, belong to the native isolation VLAN and transfers these Ethernet frames to the isolated NW (Step A19).

In addition, in order to be connected to the work NW 8, the unauthorized terminal 4, on which the quarantine agent 3 is not deployed, communicates with the quarantine device 1 using the native isolation VLAN and acquires the agent program from its isolated terminal control unit 14 (Step A20). After that, a quarantine agent 2 is created in the unauthorized terminal 4. After that, when Steps A9-A16 are executed with respect to the terminal 4, the terminal 4 is enabled for communication in the work NW 8.

As described above, according to Embodiment 1, even if the VLAN-unaware hub 6 is connected to the Layer 2 Switch 7, threat-containing terminals under the control of the hub 6 can be isolated from the work NW 8 and it becomes possible to maintain a normal NW state. In addition, in Embodiment 1, the terminals under the VLAN-unaware hub 6 are managed by the quarantine device 1 and, therefore, the manager of the quarantine system 30 can determine the status of the terminals under the VLAN-unaware hub 6.

Furthermore, while a VLAN-aware Layer 2 Switch had to be used as a concentrator in the quarantine systems described in the Background Art section, Embodiment 1 makes it possible for a Layer 2 Switch and a VLAN-unaware hub to be used together. The costs involved in the deployment of the quarantine system can be reduced, wasteful use of equipment at enterprises can be avoided, and effective asset utilization can be ensured because Embodiment 1 allows for a VLAN-unaware hub to be used with router.

In addition, the software program used in Embodiment 1 may be a software program executing Steps A1-A9, A13, and A16 shown in FIG. 6 on a computer such as a server computer. The quarantine device 1 and quarantine method used in Embodiment 1 can be implemented by installing and executing this software program on the computer. In this case, the CPU (Central Processing Unit) of the computer functions and performs processing as the terminal detection unit 11, switch control unit 12, agent control unit 13, and isolated terminal control unit 14. In addition, the hard disk drive and other storage devices provided in the computer function as the terminal information DB 15 and port information DB 16.

Embodiment 2

Figure 7:
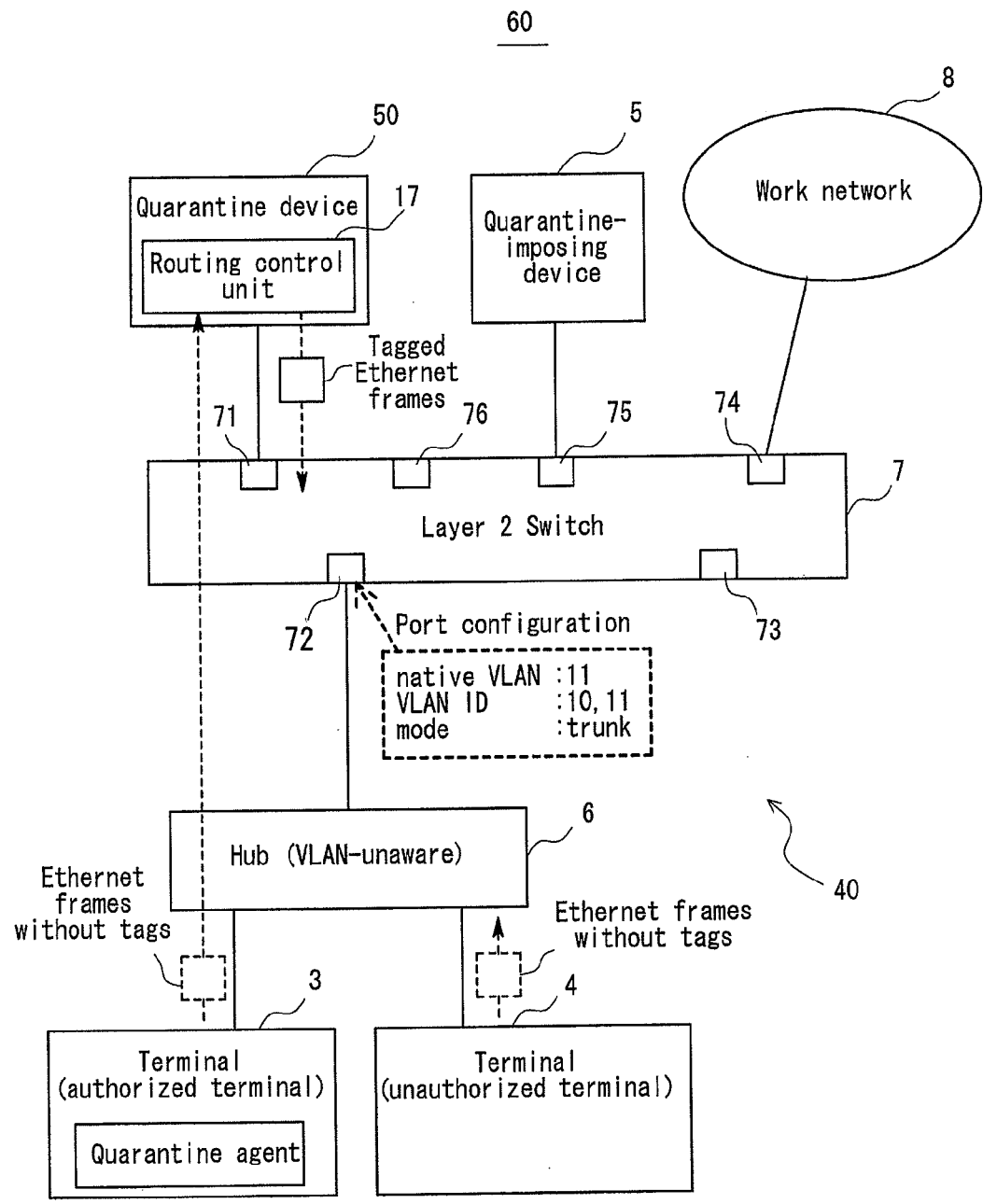
FIG. 7 is a diagram illustrating the overall configuration of the quarantine system used in Embodiment 2 of the present invention.
Figure 8:
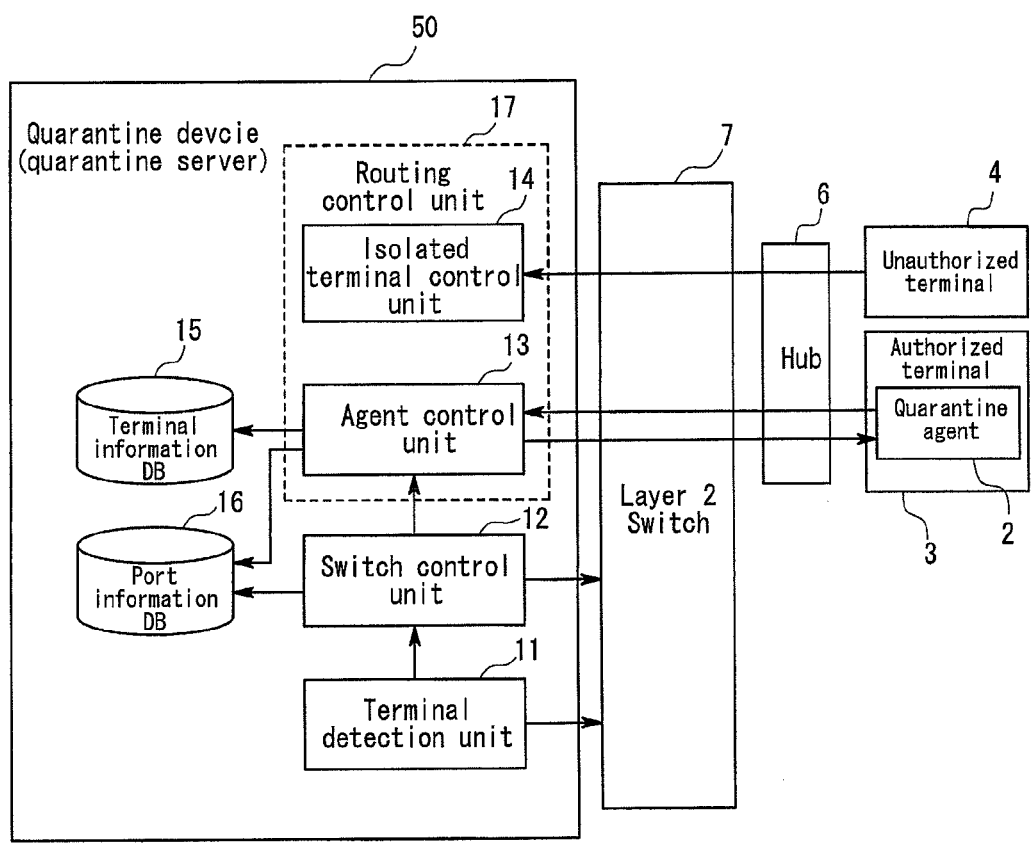
FIG. 8 is a block diagram illustrating the configuration of the quarantine device forming part of the quarantine system in Embodiment 2 of the present invention.

Next, the quarantine device, quarantine system, quarantine method, and software program used in Embodiment 2 of the present invention will be described with reference to FIG. 7-FIG. 9. First of all, the configuration of the quarantine device and quarantine system used in Embodiment 2 will be described with reference to FIG. 7 and FIG. 8. FIG. 7 is a diagram illustrating the overall configuration of the quarantine system used in Embodiment 2 of the present invention. FIG. 8 is a block diagram illustrating the configuration of the quarantine device that forms part of the quarantine system in Embodiment 2 of the present invention.

In Embodiment 2, as opposed to Embodiment 1, Ethernet frames received from authorized terminals are transferred to the work NW even if the quarantine agents deployed on the authorized terminals do not have the capability to attach VLAN tags.

As shown in FIG. 7, the quarantine device 50 used in Embodiment 2 includes a routing control unit 17. When Ethernet frames having no attached VLAN tags are transmitted from an authorized terminal 3, on which a quarantine agent 2 is deployed, the routing control unit 17 routes them from the native isolation VLAN to the work VLAN. Consequently, a capability similar to Embodiment 1 is implemented in Embodiment 2.

As shown in FIG. 8, in Embodiment 2, the routing control unit 17 is composed of an agent control unit 13 and an isolated terminal control unit 14. In Embodiment 2, when a work VLAN and a native isolation VLAN are configured on the port 72 of the Layer 2 Switch 7, the agent control unit 13 identifies authorized terminals having an agent program deployed thereon among the terminals connected to the hub 6.

Specifically, the agent control unit 13 identifies authorized terminals having an agent program deployed thereon based on information obtained from a quarantine-imposing device 5. Then, when the authorized terminals are identified, the isolated terminal control unit 14 attaches tags similar to the VLAN tags described in Embodiment 1 to the Ethernet frames transmitted by the specified terminals and routes these Ethernet frames.

In addition, in Embodiment 2, as opposed to Embodiment 1, the quarantine agent 2 deployed on the authorized terminal 3 does not have the tag attachment function unit (see FIG. 3) and does not possess the capability to attach VLAN tags. In other respects the quarantine agent 2 used in Embodiment 2 is similar to the quarantine agent used in Embodiment 1.

Next, the operation of the quarantine device 50 and quarantine system 60 used in Embodiment 2 of the present invention will be described with reference to FIG. 9. FIG. 9 is a sequence diagram illustrating the operation of the quarantine system used in Embodiment 2 of the present invention. In the description that follows, refer to FIG. 7 and FIG. 8 as appropriate. In addition, in Embodiment 2, the quarantine method is executed by operating the quarantine device 50. Accordingly, the description of the quarantine method used in Embodiment 2 is replaced by the following description of the operation of the quarantine device 50.

First, Steps B1-B12 are executed in the quarantine system 60 used in Embodiment 2. Steps B1-B12 are respectively identical to Steps corresponding to Steps A1-A12 shown in FIG. 6 in Embodiment 1. Therefore, upon execution of Step B12, the agent control unit 13 acquires information (MAC address and IP address) regarding the authorized terminal from the quarantine-imposing device 5 and acquires the VLAN number of the work VLAN from the switch control unit 12.

Next, Steps B13-B18 are executed in the quarantine system 60. Steps B13-B18 are different from the Steps shown in FIG. 6 in Embodiment 1. The dotted box shown in FIG. 9 shows Steps B13-B18. Steps starting from Step B12 are described below.

After finishing Step B12, the agent control unit 13 uses the information acquired from the quarantine-imposing device 5 to identify the terminal 3 as an authorized terminal that is connected to the VLAN-unaware hub 6 and, at the same time, has a quarantine agent 2 deployed thereon. The agent control unit 13 then instructs the isolated terminal control unit 14 to route Ethernet frames received from the identified authorized terminal 3 from the native isolation VLAN to the work VLAN (Step B13).

Next, the isolated terminal control unit 14 performs configuration in order to execute routing and when the configuration is complete, transmits a notification of completion to the agent control unit 13 (Step B14). Next, upon receipt of the notification of completion, the agent control unit 13 accesses the terminal information DB 15 (see FIG. 4) and updates the terminal information of the terminals connected to the hub 6 (Step B15).

After that, when Ethernet frames are transmitted from the authorized terminal 3, the Layer 2 Switch 7 receives them (Step B16). At such time, as opposed to Embodiment 1, no VLAN tags are attached to the received Ethernet frames. Therefore, the Layer 2 Switch 7 handles the received Ethernet frames in the same manner as Ethernet frames without VLAN tags obtained from unauthorized terminals and transmits them through the native isolation VLAN to the isolated terminal control unit 14 (Step B17).

The isolated terminal control unit 14 monitors the communications of the terminals belonging to the native isolation VLAN. Then, when Step B17 is executed, the isolated terminal control unit 14 attaches work NW VLAN tags to the received Ethernet frames and routes these Ethernet frames to the work NW 8 (Step B18). As a result of executing Step B18, the authorized terminal 3 having a quarantine agent 2 deployed thereon becomes enabled for communication with the work NW 8.

Figure 9:
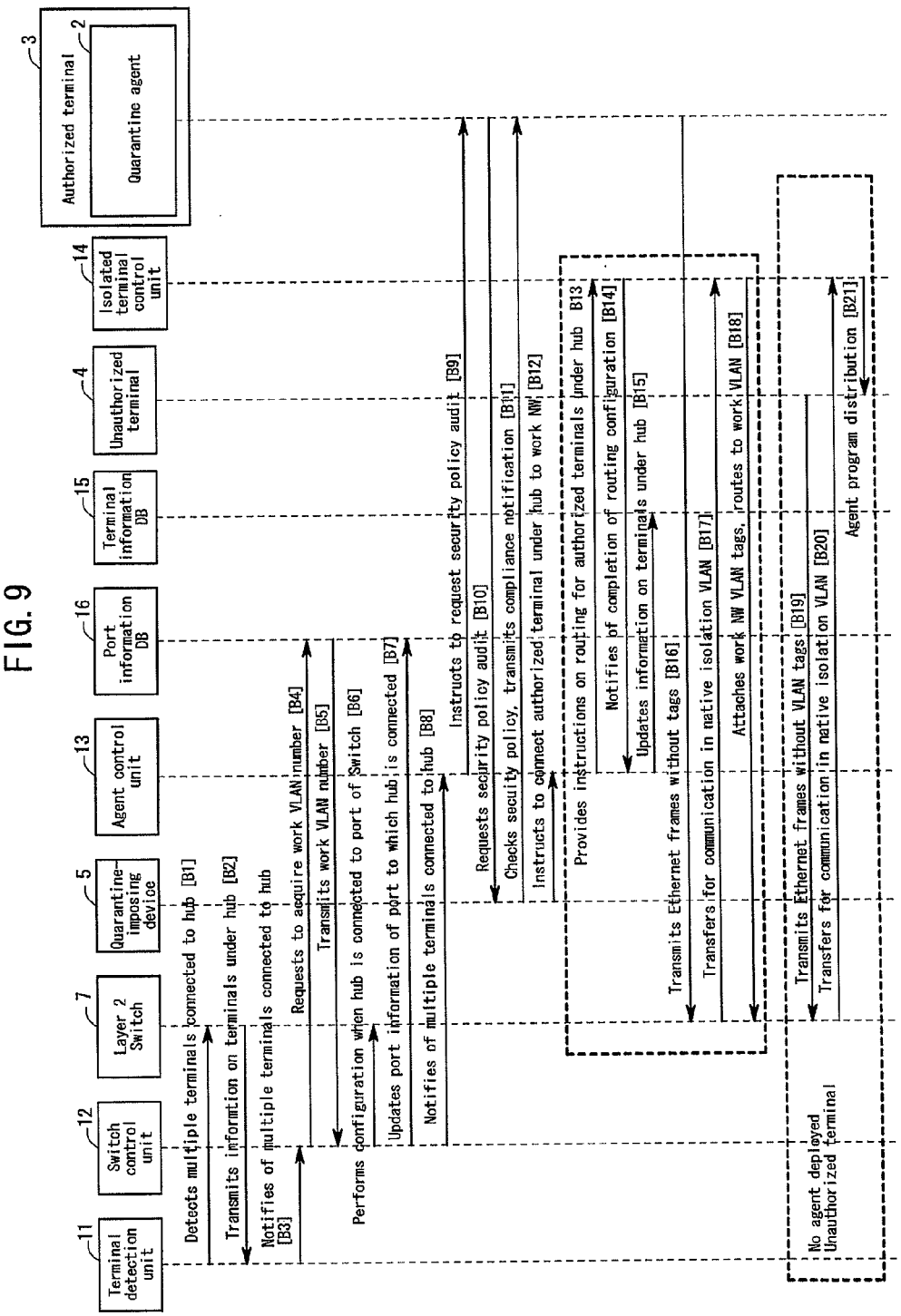
FIG. 9 is a sequence diagram illustrating the operation of the quarantine system used in Embodiment 2 of the present invention.

Steps B19-B21 shown in FIG. 9 are respectively identical to Steps corresponding to Steps A18-A20 shown in FIG. 6 in Embodiment 1. When Steps B19-B21 are executed, the Ethernet frames received from the unauthorized terminal are transferred to the isolated NW by the native isolation VLAN. In addition, the quarantine device 50 deploys an agent program on the unauthorized terminal.

As described above, in accordance with Embodiment 2, effects similar to the effects described in Embodiment 1 can be obtained even though the quarantine agent 2 does not have the capability to attach VLAN tags. Embodiment 2, which is applicable to mixed networks made up of terminals capable of attaching VLAN tags and terminals that cannot attach VLAN tags as well as to networks consisting only of terminals that cannot attach VLAN tags, can further promote the deployment of quarantine systems.

In addition, the software program used in Embodiment 1 may be a software program executing Steps B1-B9, B13-B15, and B18 shown in FIG. 9 on a computer such as server computer. The quarantine device 50 and quarantine method used in Embodiment 2 can be implemented by installing and executing this software program on the computer. In this case, the CPU (Central Processing Unit) of the computer functions and performs processing as the terminal detection unit 11, switch control unit 12, agent control unit 13, and isolated terminal control unit 14. In addition, the hard disk drive and other storage devices provided in the computer function as the terminal information DB 15 and port information DB 16.

Figure 10:
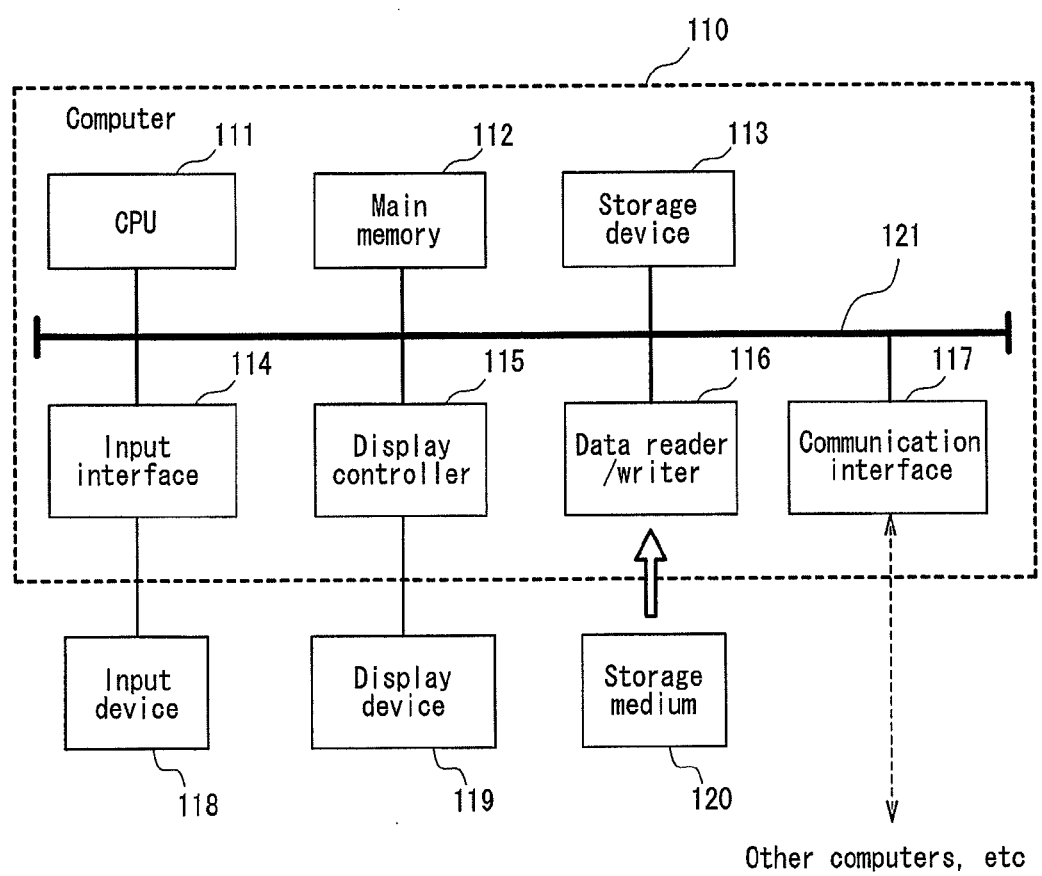
FIG. 10 is a block diagram illustrating an example of a computer implementing the quarantine devices used in the embodiments of the present invention.

Here, the computer that implements the quarantine device by executing the software programs used in Embodiments 1 and 2 will be described with reference to FIG. 10. FIG. 10 is a block diagram illustrating an example of a computer implementing the quarantine devices used in the embodiments of the present invention.

As shown in FIG. 10, the computer 110 includes a CPU 111, a main memory 112, a storage device 113, an input interface 114, a display controller 115, a data reader/writer 116, and a communication interface 117. These parts are interconnected through a bus 121 so as to permit communication of data.

The CPU 111 loads the software programs (code) of this embodiment, which are stored in the storage device 113, in the main memory 112 and performs various operations by executing them in a predetermined order. Typically, the main memory 112 is a volatile storage device, such as a DRAM (Dynamic Random Access Memory), etc. In addition, the software program used in this embodiment is supplied stored on a computer-readable storage medium 120. It should be noted that the software program used in this embodiment may be distributed on the Internet connected via the communication interface 117.

In addition to hard disks, semiconductor storage devices such as flash memory and the like are suggested as a specific example of the storage device 113. The input interface 114 acts as an intermediary for the communication of data between the CPU 111 and input devices 118 such as a keyboard and a mouse. The display controller 115 is connected to a display device 119 and controls the display of the display device 119. The data reader/writer 116, which acts as an intermediary for the communication of data between the CPU 111 and the storage medium 120, reads out software programs from the storage medium 120 and writes processing results obtained by the computer 110 to the storage medium 120. The communication interface 117 acts as an intermediary for the communication of data between the CPU 111 and other computers.

In addition, general-purpose semiconductor storage devices such as CF (Compact Flash) and SD (Secure Digital), etc., as well as Magnetic storage media such as floppy disks (Flexible Disk) or optical storage media such as CD-ROMs (Compact Disk Read Only Memory) are suggested as specific examples of the storage medium 120.

As described above, the present invention allows for quarantine to be established on each terminal on an individual basis when multiple terminals are connected to a port of the Layer 2 Switch through a VLAN-unaware concentrator. The present invention is particularly useful for networks using a mixture of VLAN-unaware concentrators and VLAN-aware Layer 2 Switches.

The whole or part of the exemplary embodiments disclosed above can be described as, but not limited to, the following supplementary notes.

(Supplementary Note 1)

A quarantine device performing quarantine processing on a network provided with a VLAN-aware Layer 2 Switch, comprising:

a terminal detection unit that, when a single terminal is connected to a specified port of the Layer 2 Switch through a VLAN-unaware concentrator, detects a connection of a new terminal to the concentrator, and a switch control unit that, upon detecting the connection of the new terminal, configures the specified port as a trunk port and, furthermore, configures a first VLAN, which transfers only Ethernet frames having preset tags attached thereto, and a second VLAN, which transfers only Ethernet frames having no tags attached thereto, on the specified port.

(Supplementary Note 2)

The quarantine device according to Supplementary note 1, wherein the network includes a work network used for work purposes and a quarantine network used for quarantine processing, and the switch control unit connects the first VLAN to the work network and connects the second VLAN to the quarantine network.

(Supplementary Note 3)

The quarantine device according to Supplementary note 1, further comprising an agent control unit that, upon configuration of the first VLAN and the second VLAN by the switch control unit, issues an instruction to attach the tags to Ethernet frames transmitted only by terminals having an agent program deployed thereon that enables communication with said quarantine device and, at the same time, satisfying the requirements established by the security policy among the terminals connected to the concentrator.

(Supplementary Note 4)

The quarantine device according to Supplementary note 3, further comprising an isolated terminal control unit that executes quarantine processing on a terminal having no agent programs deployed thereon and a terminal that does not satisfy the requirements established by the security policy among the terminals connected to the concentrator.

(Supplementary Note 5)

The quarantine device according to Supplementary note 1, further comprising a routing control unit that, upon configuration of the first VLAN and the second VLAN by the switch control unit, identifies a terminal having deployed thereon an agent program enabling communication with said quarantine device among the terminals connected to the concentrator and attaches tags to Ethernet frames transmitted by the identified terminal.

(Supplementary Note 6)

A quarantine system, including a quarantine device performing quarantine processing on a network provided with a VLAN-aware Layer 2 Switch and a plurality of terminals connected to the network;

the quarantine device comprising:

a terminal detection unit that, when a single terminal among the plurality of terminals is connected to a specified port of the Layer 2 Switch through a VLAN-unaware concentrator, detects a connection of another terminal to the concentrator, and a switch control unit that, upon detecting the connection of the other terminal, configures the specified port as a trunk port and, furthermore, configures a first VLAN, which transfers only Ethernet frames having preset tags attached thereto, and a second VLAN, which transfers only Ethernet frames having no tags attached thereto, on the specified port; and wherein the terminals connected to the concentrator attach the tags to the Ethernet frames transmitted by said terminals when so instructed by the quarantine device.

(Supplementary Note 7)

The quarantine system according to Supplementary note 6, wherein the network comprises a work network used for work purposes and a quarantine network used for quarantine processing, and the switch control unit connects the first VLAN to the work network and connects the second VLAN to the quarantine network.

(Supplementary Note 8)

The quarantine system according to Supplementary note 6, wherein the quarantine device further comprises an agent control unit, and the agent control unit, upon configuration of the first VLAN and the second VLAN by the switch control unit, issues an instruction to attach the tags to Ethernet frames transmitted only by terminals having deployed thereon an agent program that enables communication with said quarantine device and, at the same time, satisfying the requirements established by the security policy among the terminals connected to the concentrator.

(Supplementary Note 9)

The quarantine system according to Supplementary note 8, wherein the quarantine device further comprises an isolated terminal control unit, and the isolated terminal control unit executes quarantine processing on a terminal having no agent programs deployed thereon and a terminal that does not satisfy the requirements established by the security policy among the terminals connected to the concentrator.

(Supplementary Note 10)

A quarantine method used for performing quarantine processing on a network provided with a VLAN-aware Layer 2 Switch, the method comprising the steps of:

(a) when a single terminal is connected to a specified port of the Layer 2 Switch through a VLAN-unaware concentrator, detecting a connection of a new terminal to the concentrator; and (b) upon detecting the connection of the new terminal in Step (a), configuring the specified port as a trunk port and, furthermore, configuring a first VLAN, which transfers only Ethernet frames having preset tags attached thereto, and a second VLAN, which transfers only Ethernet frames having no tags attached thereto, on the specified port.

(Supplementary Note 11)

The quarantine method according to Supplementary note 10, wherein the network comprises a work network used for work purposes and a quarantine network used for quarantine processing, and in Step (b), the first VLAN is connected to the work network and the second VLAN is connected to the quarantine network.

(Supplementary Note 12)

The quarantine method according to Supplementary note 10, further comprising Step (c) in which, upon configuration of the first VLAN and the second VLAN in Step (b), an instruction is issued to attach the tags to Ethernet frames transmitted only by terminals having an agent program deployed thereon and, at the same time, satisfying the requirements established by the security policy among the terminals connected to the concentrator.

(Supplementary Note 13)

The quarantine method according to Supplementary note 12, further comprising Step (d) in which quarantine processing is executed on a terminal having no agent programs deployed thereon and a terminal that does not satisfy the requirements established by the security policy among the terminals connected to the concentrator.

(Supplementary Note 14)

The quarantine method according to Supplementary note 10, further comprising Step (e) in which, upon configuration of the first VLAN and the second VLAN in Step (b), a terminal having deployed thereon an agent program is identified among the terminals connected to the concentrator and tags are attached to Ethernet frames transmitted by the identified terminal.

(Supplementary Note 15)

A computer-readable storage medium having recorded thereon a software program for performing quarantine processing on a network provided with a VLAN-aware Layer 2 Switch using a computer, the software program including instructions causing the computer to execute the steps of:

(a) when a single terminal is connected to a specified port of the Layer 2 Switch through a VLAN-unaware concentrator, detecting a connection of a new terminal to the concentrator; and (b) upon detecting the connection of the new terminal in Step (a), configuring the specified port as a trunk port and, furthermore, configuring a first VLAN, which transfers only Ethernet frames having preset tags attached thereto, and a second VLAN, which transfers only Ethernet frames having no tags attached thereto, on the specified port.

(Supplementary Note 16)

The computer-readable storage medium according to Supplementary note 15, wherein the network comprises a work network used for work purposes and a quarantine network used for quarantine processing, and in Step (b), the first VLAN is connected to the work network and the second VLAN is connected to the quarantine network.

(Supplementary Note 17)

The computer-readable storage medium according to Supplementary note 15, further causing the computer to execute Step (c) in which, upon configuration of the first VLAN and the second VLAN in Step (b), an instruction is issued to attach the tags to Ethernet frames transmitted only by terminals having an agent program deployed thereon and, at the same time, satisfying the requirements established by the security policy among the terminals connected to the concentrator.

(Supplementary Note 18)

The computer-readable storage medium according to Supplementary note 17, further causing the computer to execute Step (d) in which quarantine processing is executed on a terminal having no agent programs deployed thereon and a terminal that does not satisfy the requirements established by the security policy among the terminals connected to the concentrator.

(Supplementary Note 19)

The computer-readable storage medium according to Supplementary note 15, further causing the computer to execute Step (e) in which, upon configuration of the first VLAN and the second VLAN in Step (b), a terminal having deployed thereon an agent program is identified among the terminals connected to the concentrator and tags are attached to Ethernet frames transmitted by the identified terminal.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A quarantine device performing quarantine processing on a network provided with a VLAN-aware Layer 2 Switch, comprising:

a terminal detection unit that, when a single terminal is connected to a specified port of the Layer 2 Switch through a VLAN-unaware concentrator, detects a connection of a new terminal to the concentrator, and a switch control unit that, upon detecting the connection of the new terminal, configures the specified port as a trunk port and, furthermore, configures a first VLAN, which transfers only Ethernet frames having preset tags attached thereto, and a second VLAN, which transfers only Ethernet frames having no tags attached thereto, on the specified port.

2. The quarantine device according to claim 1, wherein the network comprises a work network used for work purposes and a quarantine network used for quarantine processing, and the switch control unit connects the first VLAN to the work network and connects the second VLAN to the quarantine network.

3. The quarantine device according to claim 1, further comprising an agent control unit that, upon configuration of the first VLAN and the second VLAN by the switch control unit, issues an instruction to attach the tags to Ethernet frames transmitted only by terminals having an agent program deployed thereon that enables communication with said quarantine device and, at the same time, satisfying the requirements established by the security policy among the terminals connected to the concentrator.

4. The quarantine device according to claim 3, further comprising an isolated terminal control unit that executes quarantine processing on a terminal having no agent programs deployed thereon and a terminal that does not satisfy the requirements established by the security policy among the terminals connected to the concentrator.

5. The quarantine device according to claim 1 or 2, further comprising a routing control unit that, upon configuration of the first VLAN and the second VLAN by the switch control unit, identifies a terminal having deployed thereon an agent program enabling communication with said quarantine device among the terminals connected to the concentrator and attaches tags to Ethernet frames transmitted by the identified terminal.

6. A quarantine method used for performing quarantine processing on a network provided with a VLAN-aware Layer 2 Switch, the method comprising the steps of:

(a) when a single terminal is connected to a specified port of the Layer 2 Switch through a VLAN-unaware concentrator, detecting a connection of a new terminal to the concentrator; and (b) upon detecting the connection of the new terminal in Step (a), configuring the specified port as a trunk port and, furthermore, configuring a first VLAN, which transfers only Ethernet frames having preset tags attached thereto, and a second VLAN, which transfers only Ethernet frames having no tags attached thereto, on the specified port.

7. The quarantine method according to claim 6, wherein the network comprises a work network used for work purposes and a quarantine network used for quarantine processing, and in Step (b), the first VLAN is connected to the work network and the second VLAN is connected to the quarantine network.

8. The quarantine method according to claim 6, further comprising Step (c) in which, upon configuration of the first VLAN and the second VLAN in Step (b), an instruction is issued to attach the tags to Ethernet frames transmitted only by terminals having an agent program deployed thereon and, at the same time, satisfying the requirements established by the security policy among the terminals connected to the concentrator.

9. The quarantine method according to claim 8, further comprising Step (d) in which quarantine processing is executed on a terminal having no agent programs deployed thereon and a terminal that does not satisfy the requirements established by the security policy among the terminals connected to the concentrator.

10. The quarantine method according to claim 6, further comprising Step (e) in which, upon configuration of the first VLAN and the second VLAN in Step (b), a terminal having deployed thereon an agent program is identified among the terminals connected to the concentrator and tags are attached to Ethernet frames transmitted by the identified terminal.

11. A non-transitory computer-readable storage medium having recorded thereon a software program for performing quarantine processing on a network provided with a VLAN-aware Layer 2 Switch using a computer, the software program comprising instructions causing the computer to execute the steps of:

(a) when a single terminal is connected to a specified port of the Layer 2 Switch through a VLAN-unaware concentrator, detecting a connection of a new terminal to the concentrator; and (b) upon detecting the connection of the new terminal in Step (a), configuring the specified port as a trunk port and, furthermore, configuring a first VLAN, which transfers only Ethernet frames having preset tags attached thereto, and a second VLAN, which transfers only Ethernet frames having no tags attached thereto, on the specified port.

12. The no transitory computer-readable storage medium according to claim 11, wherein the network comprises a work network used for work purposes and a quarantine network used for quarantine processing, and in Step (b), the first VLAN is connected to the work network and the second VLAN is connected to the quarantine network.

13. The non-transitory computer-readable storage medium according to claim 11 further causing the computer to execute Step (c) in which, upon configuration of the first VLAN and the second VLAN in Step (b), an instruction is issued to attach the tags to Ethernet frames transmitted only by terminals having an agent program deployed thereon and, at the same time, satisfying the requirements established by the security policy among the terminals connected to the concentrator.

14. The non transitory computer-readable storage medium according to claim 13, further causing the computer to execute Step (d) in which quarantine processing is executed on a terminal having no agent programs deployed thereon and a terminal that does not satisfy the requirements established by the security policy among the terminals connected to the concentrator.

15. The non-transitory computer-readable storage medium according to claim 11, further causing the computer to execute Step (e) in which, upon configuration of the first VLAN and the second VLAN in Step (b), a terminals having deployed thereon an agent program is identified among the terminals connected to the concentrator and tags are attached to Ethernet frames transmitted by the identified terminal.

* * * * *